US008948167B2

United States Patent
Shah et al.

(10) Patent No.: US 8,948,167 B2
(45) Date of Patent: Feb. 3, 2015

(54) SYSTEM AND METHOD FOR USING DOMAINS TO IDENTIFY DEPENDENT AND INDEPENDENT OPERATIONS

(75) Inventors: Lacky V. Shah, Los Altos Hills, CA (US); Sean J. Treichler, Sunnyvale, CA (US); Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 192 days.

(21) Appl. No.: 13/233,927

(22) Filed: Sep. 15, 2011

(65) Prior Publication Data

US 2013/0070760 A1    Mar. 21, 2013

(51) Int. Cl.
*H04L 12/819*    (2013.01)

(52) U.S. Cl.
CPC .................................. *H04L 47/215* (2013.01)
USPC ............................ 370/389; 370/352; 370/251

(58) Field of Classification Search
USPC .......................................... 370/251, 352, 389
See application file for complete search history.

(56) References Cited

U.S. PATENT DOCUMENTS

| 7,467,289 | B1 * | 12/2008 | Garlick et al. | 712/228 |
| 8,310,482 | B1 * | 11/2012 | Hakura et al. | 345/420 |
| 2004/0107421 | A1 * | 6/2004 | VoBa et al. | 718/102 |
| 2007/0186057 | A1 * | 8/2007 | Moll et al. | 711/146 |
| 2010/0257507 | A1 * | 10/2010 | Warren | 717/106 |
| 2011/0080404 | A1 * | 4/2011 | Rhoades et al. | 345/423 |
| 2012/0151145 | A1 * | 6/2012 | Lyashevsky | 711/125 |

* cited by examiner

*Primary Examiner* — Nicholas Jensen
*Assistant Examiner* — Berhanu Belete
(74) *Attorney, Agent, or Firm* — Patterson & Sheridan, LLP (57) ABSTRACT

One embodiment of the present invention is a control unit for distributing packets of work to one or more consumer of works. The control unit is configured to assign at least one processing domain from a set of processing domains to each consumer included in the one or more consumers, receive a plurality of packets of work from at least one producer of work, wherein each packet of work is associated with a processing domain from the set of processing domains, and a first packet of work associated with a first processing domain can be processed by the one or more consumers independently of a second packet of work associated with a second processing domain, identify a first consumer that has been assigned the first processing domain, and transmit the first packet of work to the first consumer for processing.

22 Claims, 8 Drawing Sheets

SYSTEM AND METHOD FOR USING DOMAINS TO IDENTIFY DEPENDENT AND INDEPENDENT OPERATIONS

BACKGROUND OF THE INVENTION

1. Field of the Invention

The present invention relates generally to the field of parallel processing and, more specifically, to a system and method for using domains to identify dependent and independent operations.

2. Description of the Related Art

For various computing cases, a programmer writes code that generates units of work to be processed in a processing unit. Within a set of units of work generated by the code, some units of work may be dependent on one another, while other may be completely independent of one another. Units of work that dependent on one another need to be processed in order to preserve the dependency.

Processing units often include multiple processors, each processing units of work and generating outputs based on the processing. The outputs are assembled for further processing, if any. In a typical work distribution approach, any processor that has processing bandwidth pops a unit of work from top of an input queue, check for all the dependencies related to the unit of work, wait for all the prior units of work to complete, and then process the unit of work that was popped.

One drawback to such an approach is that it requires every processor to communicate with each other to indicate the completion of different units of work. Requiring inter-processor communication increases the processing burden on the processors as state needs to be managed and tracked constantly. In addition, units of work that are not dependent on any outstanding units of work but are not at the top of the input queue are not processed even when there is processing bandwidth, thus unnecessarily slowing down the processing of work.

As the foregoing illustrates, what is needed in the art is a mechanism for efficiently transmitting state information to the GPU over a limited-bandwidth channel and for providing a flexible interface to accept state information in a variety of formats.

SUMMARY OF THE INVENTION

One embodiment of the present invention is a control unit for distributing packets of work to one or more consumer of works. The control unit is configured to assign at least one processing domain from a set of processing domains to each consumer included in the one or more consumers, receive a plurality of packets of work from at least one producer of work, wherein each packet of work is associated with a processing domain from the set of processing domains, and a first packet of work associated with a first processing domain can be processed by the one or more consumers independently of a second packet of work associated with a second processing domain, identify a first consumer that has been assigned the first processing domain, and transmit the first packet of work to the first consumer for processing.

Advantageously, by grouping units of work with dependencies in a single domain, and processing those units of work in a single work consumer, the current approach eliminates the need for inter-processor communication. Further, because units of work belonging to the same domain are all transmitted to the same work consumer, a unit of work belonging to a different domain assigned to a different work consumer need not wait for the processing of the other units of work to complete until it can be processed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
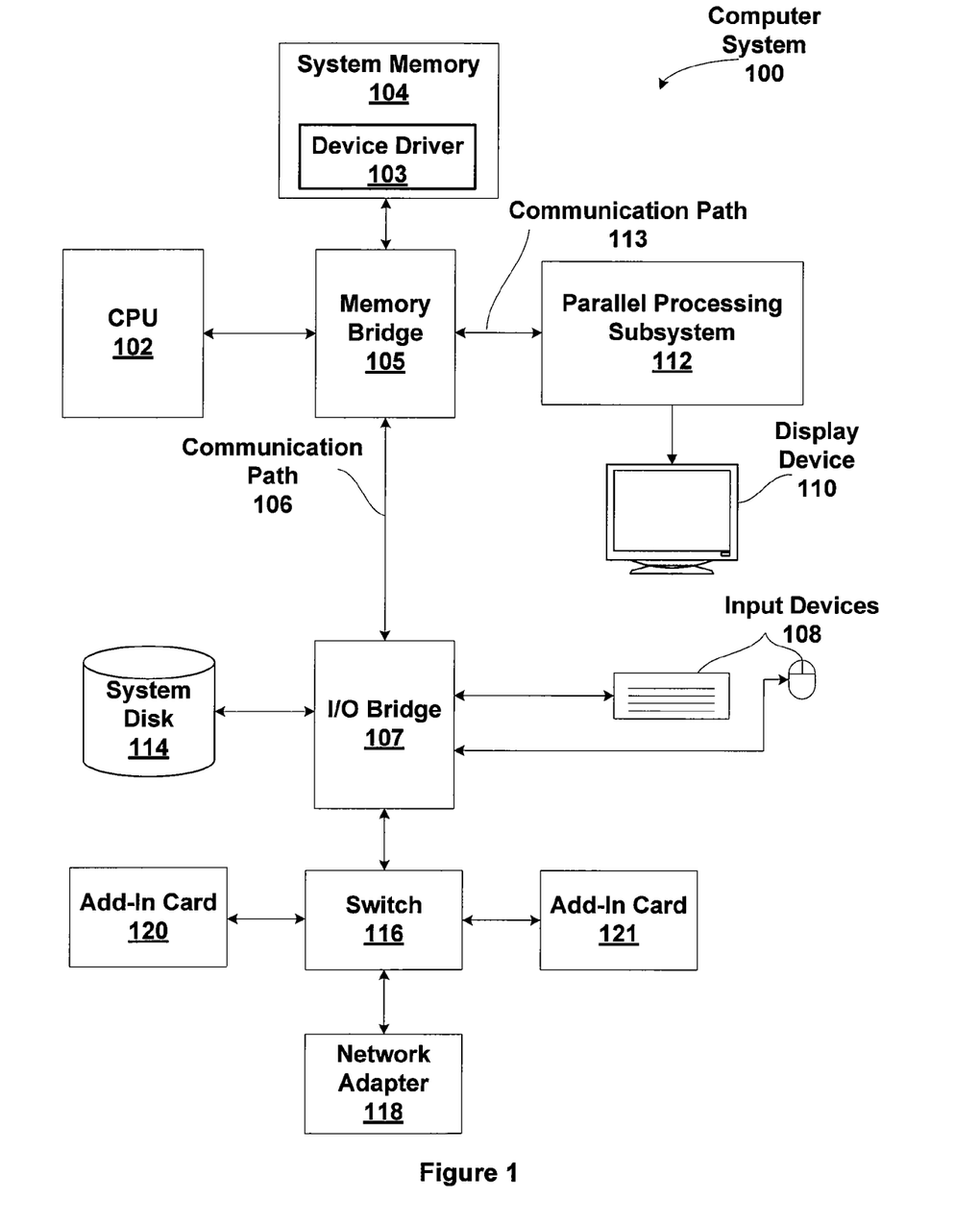
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
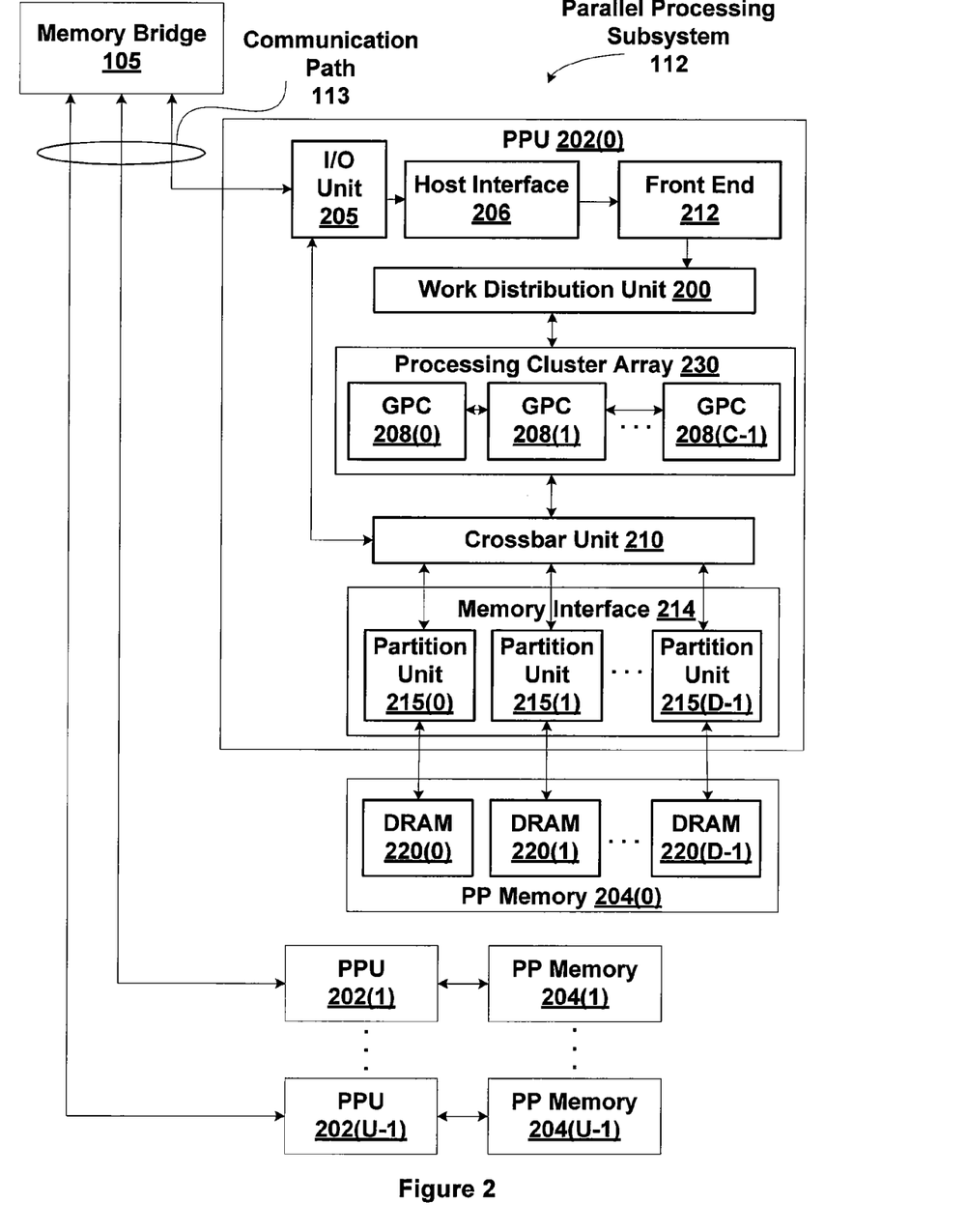
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks that are dependent on the previous task. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
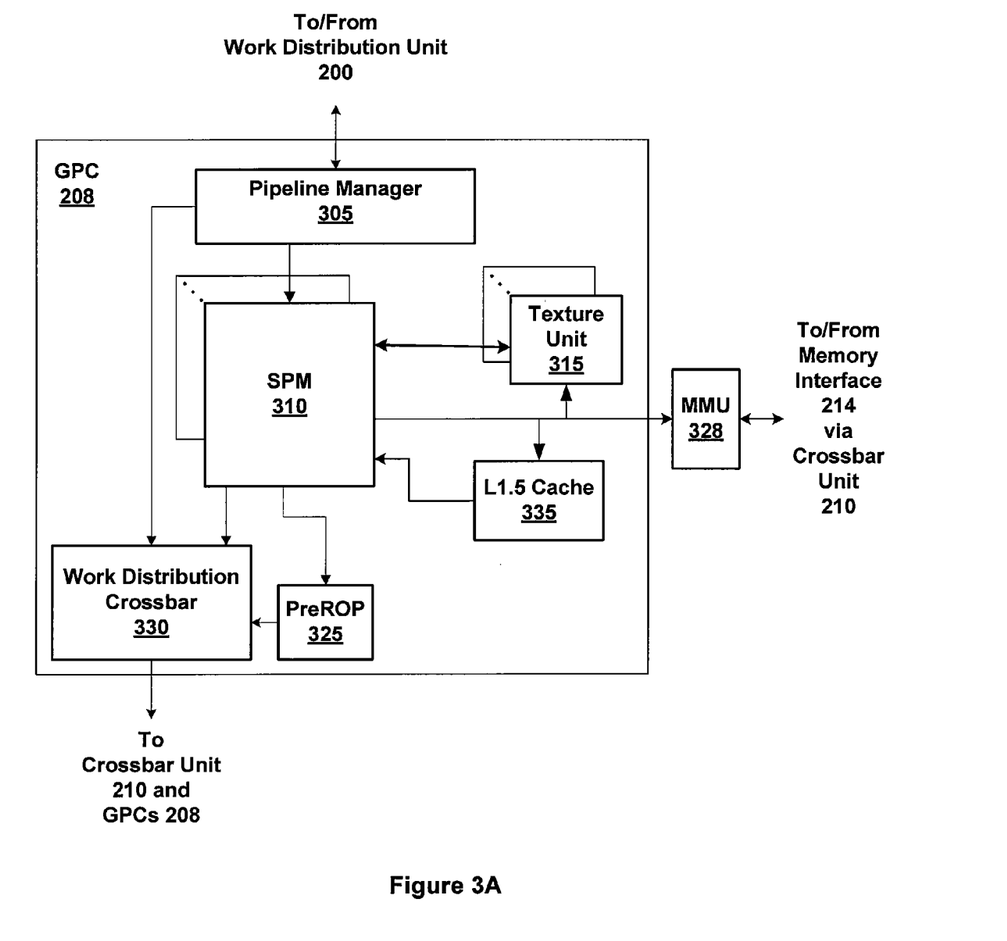
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
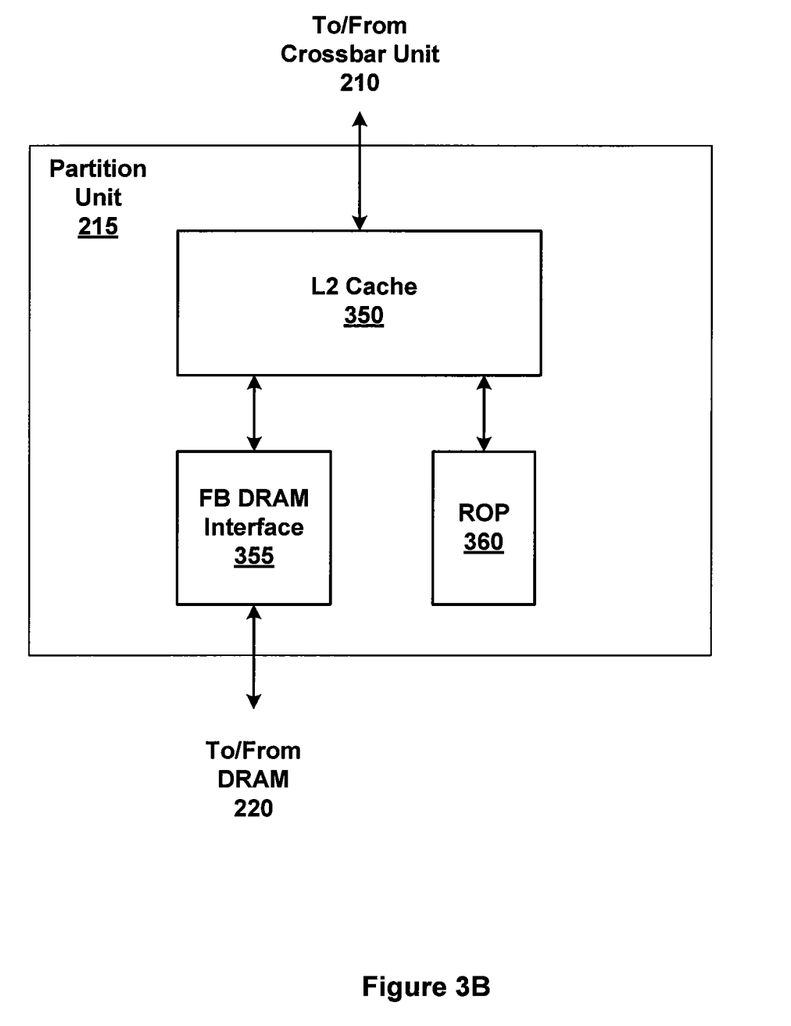
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
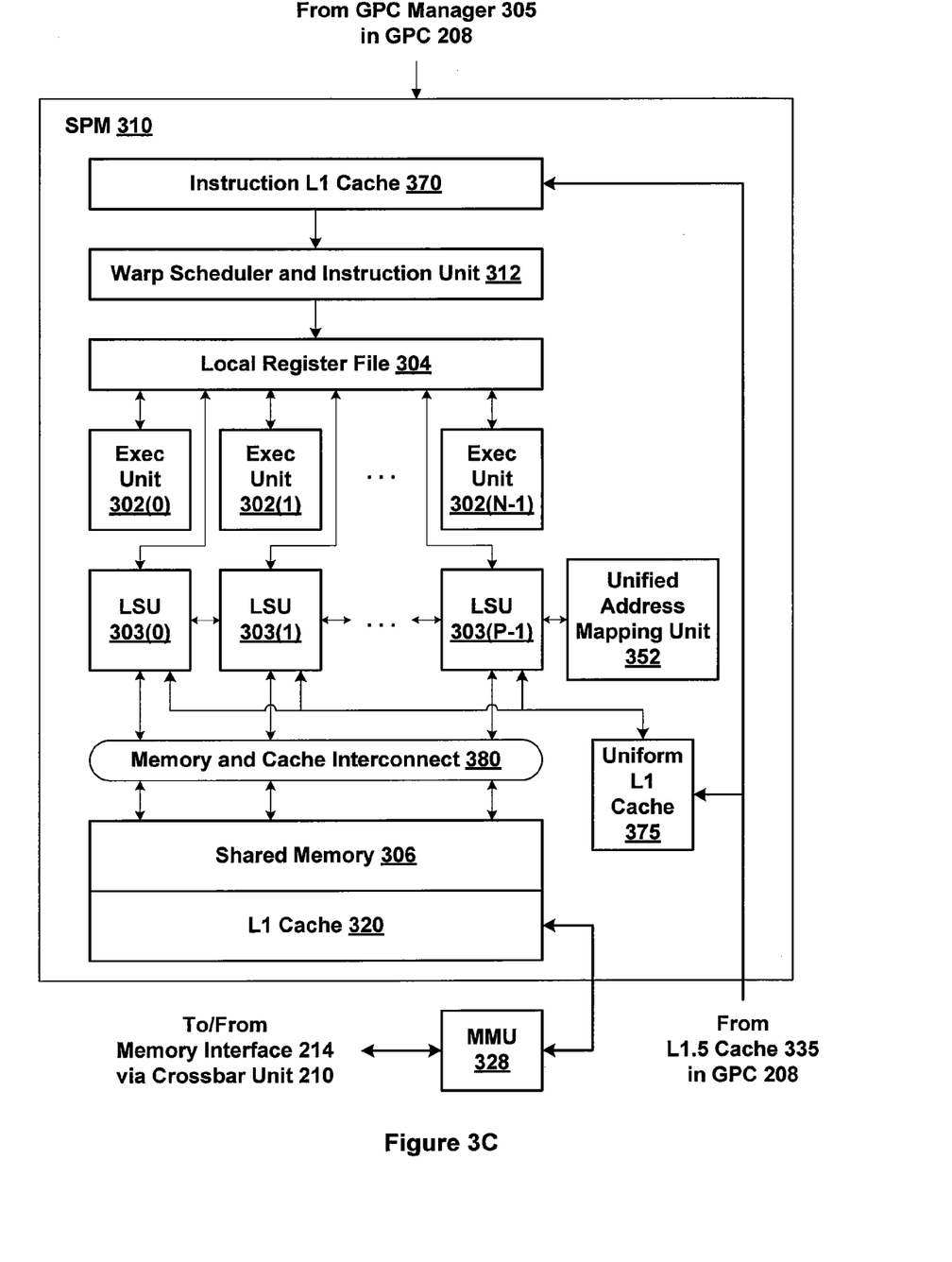
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Graphics Pipeline Architecture

Figure 4:
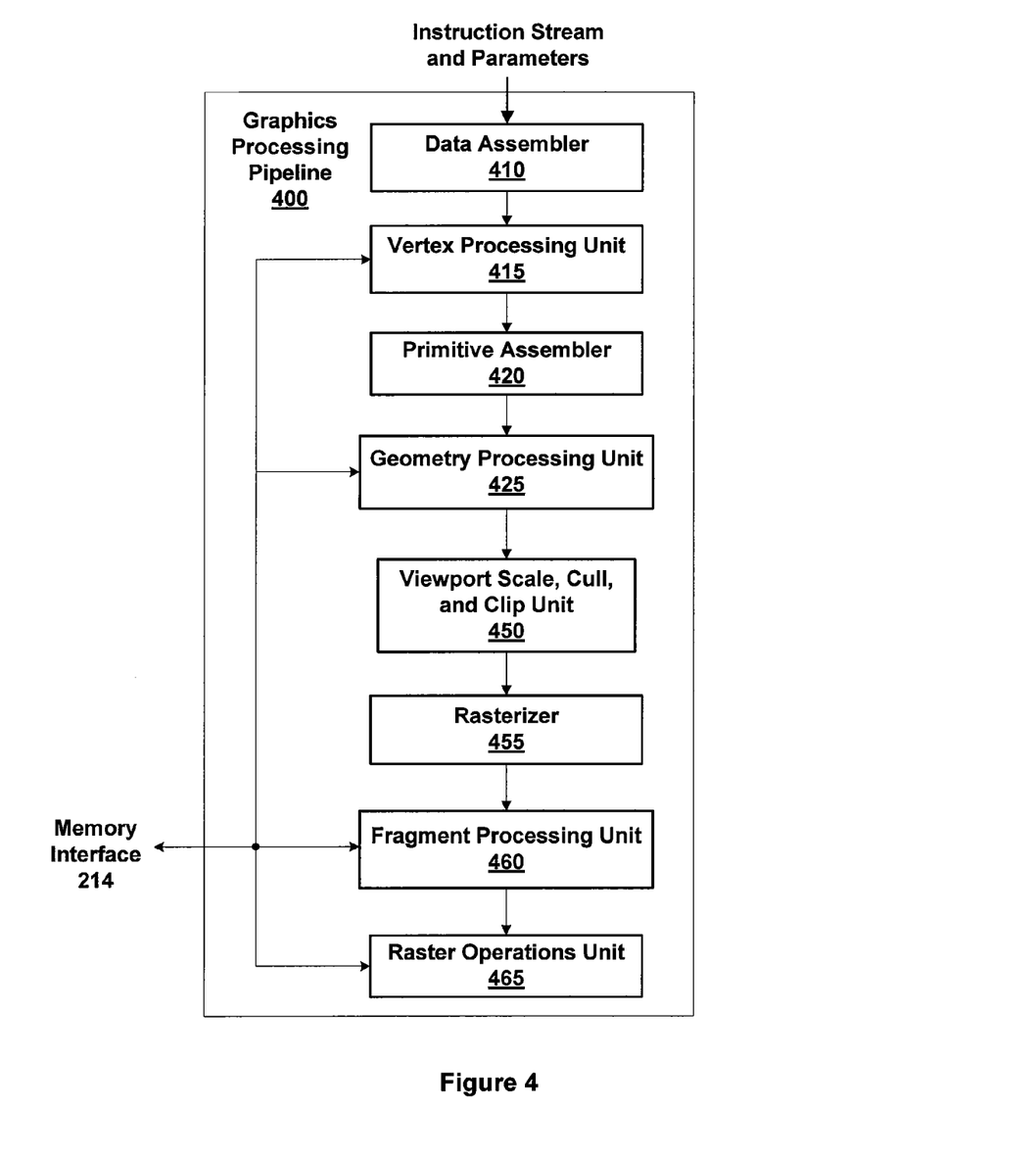
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Work Distribution Based on Domains

Figure 5:
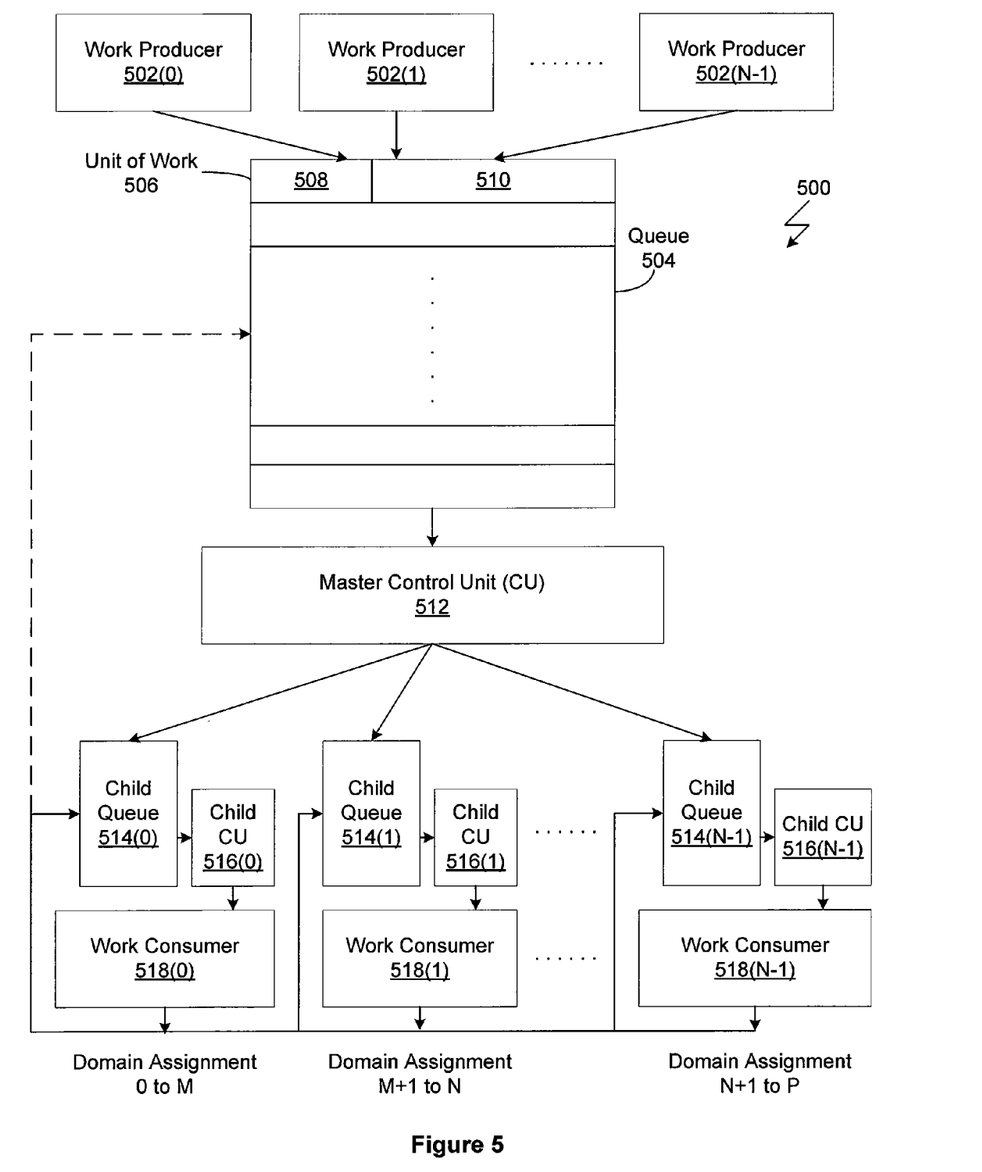
FIG. 5 is a block diagram of a system configured to distribute packets of work based on assigned domains, according to one embodiment of the present invention.

FIG. 5 is a block diagram of a system 500 configured to distribute packets of work based on assigned domains, according to one embodiment of the present invention. The system 500 includes work producers 502, a work queue 504, a master control unit (CU) 512, child queues 514, child control units (CUs) 516 and work consumers 518.

In operation, work producers 502 produce units of work, such as unit of work 506, that are transmitted to the queue 504 for temporary storage until the units of work can be transmitted to the work consumers 518. A work producer 502 is any hardware unit or software engine that generates work to be processed within the work consumers 518. In one embodiment, a work consumer 518 is a GPC 208 described above. In another embodiment, a work consumer 518 is an SPM 310 described above.

A unit of work generated by a work producer 502 includes a domain identifier portion and a token portion. For example, the unit of work 506 includes the domain identifier portion 508 and the token portion 510. The token portion 510 includes the actual data to be processed by the work consumer 518. The domain identifier portion 508 specifies a particular domain to which the unit of work 506 belongs. The particular domain to which a unit of work belongs is determined by the work producer 502 that generated the unit of work. In another embodiment, the dependencies between different units of work can be analyzed after a unit of work is received from the work producer 502 to determine the domain to which the unit of work belongs.

Units of work belonging to the same domain may have dependencies on each other, need to be processed in order, and the output of processing the units of work needs to be stored in an output queue (not shown) in order. Units of work belonging to different domains are guaranteed to be independent and can be processed in any order. For example, when generating units of work related to pixel processing, for all pixels belonging to the same (x,y) co-ordinates, the related units of work are tagged with the same domain. Units of work related to pixels belonging to a different (x,y) co-ordinate are tagged with a different domain. In such a manner, all pixels with the same (x,y) are processed in order, but there is no ordering enforced for pixels that have a different (x,y).

The master control unit 512 distributes units of work stored in the queue 504 to the child queues 514 associated with the work consumers 518. In operation, each work consumer 518 is assigned at least one domain. A unit of work belonging to a domain assigned to a particular work consumer 518 is transmitted to the child queue 514 associated with that work consumer 518. For example, if work consumer 518(0) is assigned domains 0-4, any unit of work that belongs to any one of the domains 0-4 is transmitted to the child queue 514(0) associated with the work consumer 518(0). In such a manner, units of work belonging to the same domain are processed within the same work consumer 518. Since dependencies only exist between units of work belonging to the same domain, different work consumers 518 can operate independently and inter-work consumer communication is not needed.

In one embodiment, the master control unit 512 creates domain ids and sub-domain ids for units of work in a queue that do not have any domains assigned. In such a manner, workload is balanced across multiple work consumers. Such an embodiment, however, is possible only when the units of work in the queue are independent of one another.

The child queues 514 temporarily store units of work transmitted by the master control unit 512 until those units of work are transmitted to the associated work consumer 518. The child control unit 516 associated with each work consumer 518 determines when that work consumer receives new units of work from the associated child queue 514 for processing. Units of work stored in a child queue 514 are transmitted to the associated work consumer 518 by the child control unit 516 in the order in which those units of work were received from the master control unit 512 (and the order in which those units of work are stored in the child queue 514). Since dependencies exist between units of work belonging to the same domain, thus units of work stored in the same child queue 514, the units of work need to be processed in the order in which those units of work were received.

In some scenarios, when a particular unit of work is processed by a corresponding work consumer 518, multiple secondary units of work are generated. The secondary units of work are stored in an output queue in the order in which the units of work were generated until those units of work are distributed for further processing. Each secondary unit of work is automatically assigned a sub-domain that is linked to the domain that was assigned to the unit of work that caused the generation of the secondary unit of work. In a similar manner to the units of work transmitted by the work producers 502, secondary units of work that can have dependencies between each other are assigned the same sub-domain. For example, if a unit of work that belongs to the domain "3" causes the generation of a secondary unit of work, then that secondary unit of work is assigned to sub-domain "3.1," related to the domain "3." Similarly, another secondary unit is assigned to sub-domain "3.1" if the secondary unit of work may be dependent on the previous secondary unit of work. Conversely, the other secondary unit is assigned to a sub-domain "3.2" (or any other different sub-domain) if the secondary unit of work is determined to be completely independent of the previous secondary unit of work. In such a manner, secondary units of work are also assigned sub-domains and those sub-domains keep reference to the domain to which the unit of work that caused the generation of the secondary units of work belonged.

Secondary units of work generated when a unit of work is processed within a particular work consumer 518 can be processed by the same work consumer 518. Alternatively, secondary units of work belonging to the same sub-domain can be processed in a different work consumer 518. The master control unit 512, given the processing state of the different work consumer 518, may reassign domains and sub-domains such that work that is generated is more evenly balanced.

It is important to note that units of work belonging to different sub-domains can be processed in parallel (across multiple work consumers), but the output of the processing is stored in the output queue in order based on the higher level domain. Further, any output generated by the work consumers when processing units of work is stored in the order in which the units of work were received from the work producers 502.

In an alternative embodiment, the techniques described herein are implemented in a system where the operations of the master control unit 512 and the child control units 516 are performed by a single control unit. Persons skilled in the art would recognize that any system that is configured to perform the techniques described herein is within the scope of the present invention.

Figure 6:
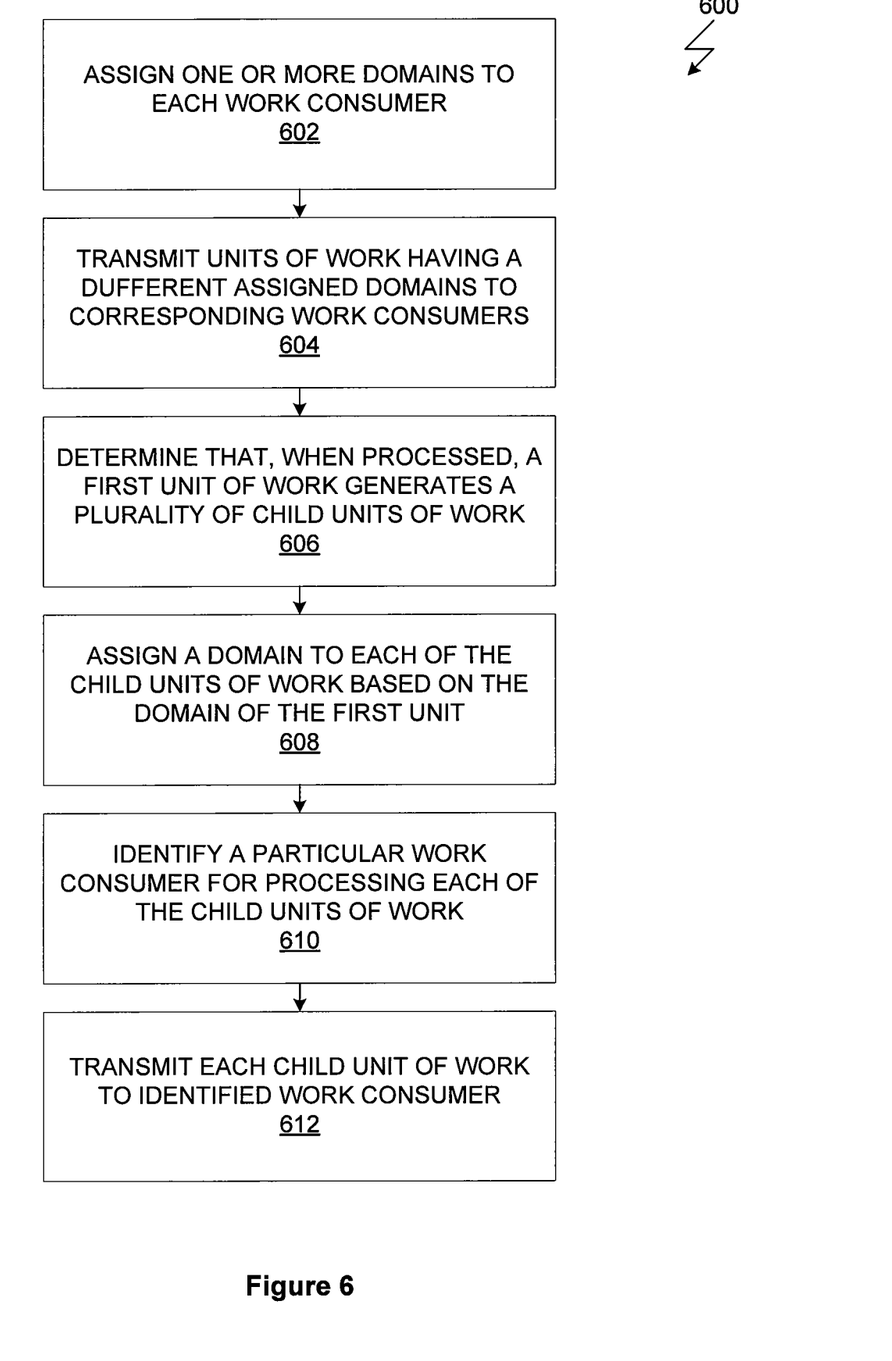
FIG. 6 is a flow diagram of method steps for distributing work to different work consumers based on domain assignments, according to one embodiment of the present invention.

FIG. 6 is a flow diagram of method steps for distributing work to different work consumers based on domain assignments, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602, where the master control unit 512 assigns one or more domains to each work consumer 518. At step 604, the master control unit 512 distributes units of work stored in the queue 504 to the child queues 514 associated with the work consumers 518. In operation, a unit of work belonging to a domain assigned to a particular work consumer 518 is transmitted to the child queue 514 associated with that work consumer 518.

At step 606, the child control unit 516 associated with a particular work consumer 518 determines that, when a first unit of work is processed by the work consumer 518, a plurality of secondary units of work are generated. At step 608, the child control unit 516 assigns a sub-domain to each secondary unit of work generated by the work consumer 518. The sub-domains assigned to the secondary units of work are related to the domain to which the first unit of work belongs.

At step 610, a work consumer 518 is identified for each child unit of work based on the assigned sub-domains. In some scenarios, the master control unit 512, given the processing state of the different work consumer 518, may reassign domains and sub-domains such that work that is generated is more evenly balanced. At step 612, each secondary unit of work is transmitted to the work consumer 518 that is assigned the sub-domain to which the secondary unit of work belongs.

Advantageously, by grouping units of work with dependencies in a single domain, and processing those units of work in a single work consumer, the current approach eliminates the need for inter-processor communication. Further, because units of work belonging to the same domain are all transmitted to the same work consumer, a unit of work belonging to a different domain assigned to a different work consumer need not wait for the processing of the other units of work to complete until it can be processed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A control unit for distributing packets of work to be processed by one or more consumers of work and configured to:
   assign at least one processing domain from a set of processing domains to each consumer included in the one or more consumers, wherein all packets of work assigned to a particular processing domain included in the set of processing domains are not dependent on any packet of work assigned to a different processing domain, and wherein the set of processing domains includes a first sub-domain and a second sub-domain;
   receive a plurality of packets of work from at least one producer of work, wherein:
      each packet of work is associated with a processing domain from the set of processing domains and processing packets of work associated with a first processing domain does not depend on processing packets of work associated with a second processing domain, and
      at least one packet of work included in the plurality of packets of work, when processed, generates a first secondary packet of work associated with the first sub-domain and a second secondary packet of work associated with the second sub-domain; and
   identify a first consumer that has been assigned the first processing domain;
   transmit a first packet of work associated with the first processing domain to the first consumer for processing,
   wherein each of the one or more consumers resides within a graphics processing unit.

2. The control unit of claim 1, wherein a plurality of child packets of work is generated when the first packet of work is processed by the first consumer.

3. The control unit of claim 2, wherein each child packet of work is stored in an output queue in the order in which the child packet of work is generated.

4. The control unit of claim 2, further configured to associate a child processing domain related to the first processing domain with each child packet of work.

5. The control unit of claim 4, further configured to assign the child processing domain to the first consumer, and transmitting each child packet of work associated with the child processing domain to the first consumer for processing.

6. The control unit of claim 4, further configured to determine that the first consumer is overloaded, assigning the child processing domain to a second consumer included in the one or more consumers, and transmitting each child packet of work associated with the child processing domain to the second consumer for processing.

7. The control unit of claim 1, further configured to transmit all other packets of work that are included in the plurality of packets of work and associated with the first processing domain to the first consumer for processing.

8. The control unit of claim 7, wherein each packet of work transmitted to the first consumer is processed in the order in which the packet of work is received from the at least one producer of work.

9. The control unit of claim 8, wherein the first packet of work is received from the at least one producer before a third packet of work associated with the first processing domain is received from the at least one producer, and first output that is generated when the first packet of work is processed by the first consumer is stored in an output queue before second output that is generated when the third packet of work is processed by the first consumer is stored in the output queue.

10. The control unit of claim 1, further configured to identify a second consumer that has been assigned the second processing domain, and transmitting the second packet of work to the second consumer for processing, wherein the first packet of work is received from the at least one producer before the second packet of work is received from the at least one producer, and a first output that is generated when the first packet of work is processed by the first consumer is stored in an output queue before a second output that is generated when the second packet of work is processed by the second consumer is stored in the output queue.

11. The control unit of claim 1, wherein the received plurality of packets of work are not associated with processing domains and further comprising associating each packet of work with a processing domain.

12. A computer-implemented method for distributing packets of work to be processed by one or more consumers of work comprising:
   assigning at least one processing domain from a set of processing domains to each consumer included in the one or more consumers, wherein all packets of work assigned to a particular processing domain included in the set of processing domains are not dependent on any packet of work assigned to a different processing domain;
   receiving a plurality of packets of work from at least one producer of work, wherein:
      each packet of work is associated with a processing domain from the set of processing domains and processing packets of work associated with a first processing domain does not depend on processing packets of work associated with a second processing domain;
   identifying a first consumer that has been assigned the first processing domain; and
   transmitting a first packet of work associated with the first processing domain to the first consumer for processing,
   wherein each of the one or more consumers resides within a graphics processing unit.

13. The method of claim 11, wherein a plurality of child packets of work is generated when the first packet of work is processed by the first consumer.

14. The method of claim 13, wherein each child packet of work is stored in an output queue in the order in which the child packet of work is generated.

15. The method of claim 13, further comprising associating a child processing domain related to the first processing domain with each child packet of work.

16. The method of claim 15, further comprising assigning the child processing domain to the first consumer, and transmitting each child packet of work associated with the child processing domain to the first consumer for processing.

17. The method of claim 15, further comprising determining that the first consumer is overloaded, assigning the child processing domain to a second consumer included in the one or more consumers, and transmitting each child packet of work associated with the child processing domain to the second consumer for processing.

18. The method of claim 12, further comprising transmitting all other packets of work that are included in the plurality of packets of work and associated with the first processing domain to the first consumer for processing.

19. The method of claim 18, wherein each packet of work transmitted to the first consumer is processed in the order in which the packet of work is received from the at least one producer of work.

20. A computer system, comprising:
one or more producers of work;
one or more consumers of work; and
a control unit configured to:
assign at least one processing domain from a set of processing domains to each consumer included in the one or more consumers, wherein all packets of work assigned to a particular processing domain included in the set of processing domains are not dependent on any packet of work assigned to a different processing domain,
receive a plurality of packets of work from at least one producer of work, wherein:
each packet of work is associated with a processing domain from the set of processing domains and processing packets of work associated with a first processing domain does not depend on processing packets of work associated with a second processing domain;
identify a first consumer that has been assigned the first processing domain, and
transmit a first packet of work associated with the first processing domain to the first consumer for processing,
wherein each of the one or more consumers resides within a graphics processing unit.

21. The control unit of claim 1, wherein at least one packet of work included in each processing domain is dependent on at least one other packet of work included in that processing domain.

22. The control unit of claim 1, wherein a first packet of work is dependent on a second packet of work in the case that, to obtain correct results, the first packet of work and the second packet of work need to be processed in order.

* * * * *